United States Patent [19]

Shih

[11] Patent Number: 5,758,854
[45] Date of Patent: Jun. 2, 1998

[54] STEEL POST FOR SUPPORTING A MOLDING BOARD

[76] Inventor: Lung-Li Shih, 4F, No. 29, Lane 86, Wu Gong 2nd rd., Hsing Juang City, Taipei Hsien, Taiwan

[21] Appl. No.: 851,995

[22] Filed: May 6, 1997

[51] Int. Cl.$^6$ .................................................. F16M 13/00
[52] U.S. Cl. .................................................. 248/354.3
[58] Field of Search .............................. 248/354.3, 354.4, 248/354.6, 354.1, 357, 200.1; 52/638, 126.6, 127.2

[56] References Cited

U.S. PATENT DOCUMENTS 5,048,242  9/1991  Cline ............................... 52/126.6
5,400,994  3/1995  Shawwaf et al. ................ 248/354.3

*Primary Examiner*—Ramon O. Ramirez
*Attorney, Agent, or Firm*—Browdy and Neimark

[57] ABSTRACT

A steel post is composed of an outer tube, an inner tube, two retaining members, a position confining member, a fastening member, and an elastic element. The inner tube is received in the outer tube such that the inner tube can be extracted and retracted, and that the extrated inner tube is located by the clamping mechanism of the retaining members. The displacement of the retaining members is confined by the position confining member. The fastening member serves to fasten and unfasten the retaining members so as to enable the extracted inner tube to be retracted. The elastic element enables the retaining members to remain disengaged with the inner tube.

15 Claims, 10 Drawing Sheets

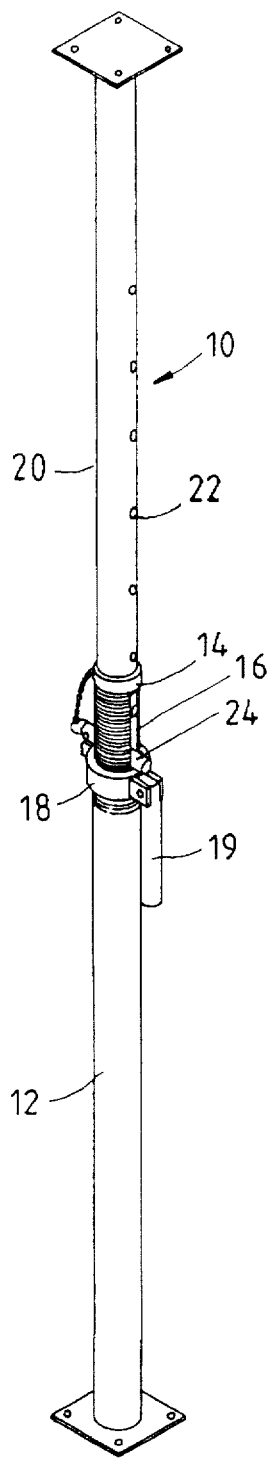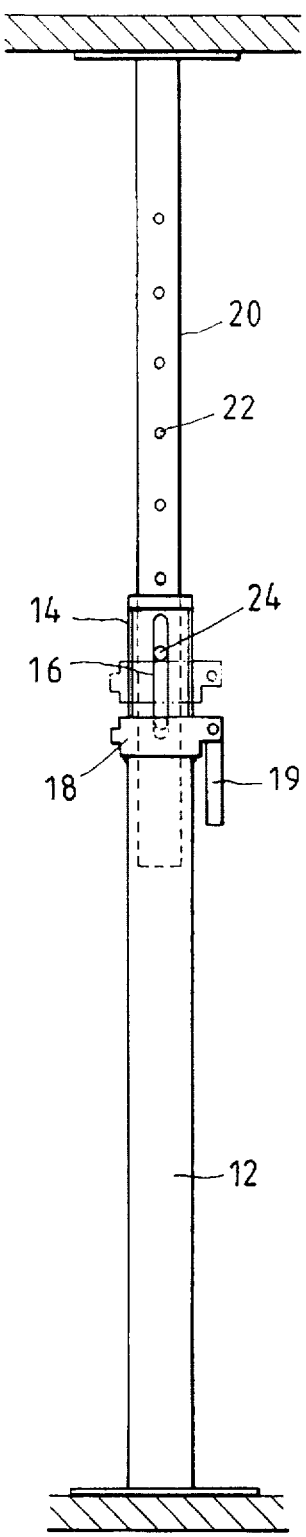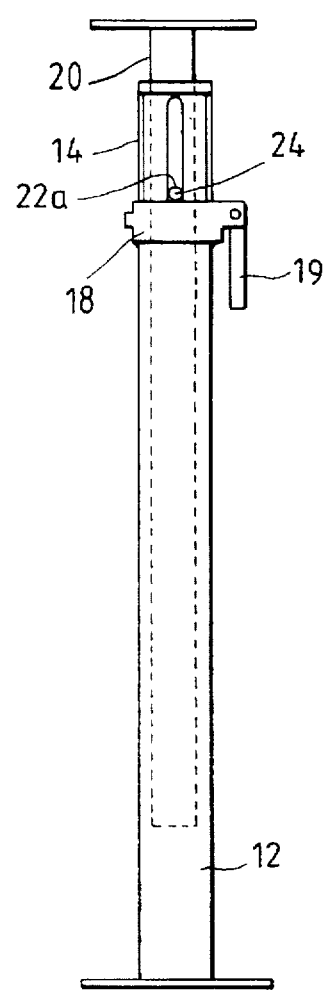
FIG. 1
PRIOR ART
FIG. 2
PRIOR ART
FIG. 3
PRIOR ART 5,758,854

STEEL POST FOR SUPPORTING A MOLDING BOARD

FIELD OF THE INVENTION

The present invention relates generally to a supporting post, and more particularly to a steel post for supporting the molding board.

BACKGROUND OF THE INVENTION

As shown in FIG. 1, a prior art steel post 10 for supporting a molding board is composed of an outer support 12, an adjusting seat 14 fastened with the top end of the outer support 12, an urging nut 18, an inner support 20, and a pin 24. The adjusting seat 14 is provided in the periphery thereof with a threaded portion and two slots 16. The urging nut 18 is fastened with the adjusting seat 14. The inner support 20 is held between the outer support 12 and the adjusting seat 14 and is provided in the periphery thereof with a plurality of pin holes 22 which are equidistantly arranged. The pin 24 is engaged with the slots 16 of the adjusting seat 14 and the pin holes 22 of the inner support 20. In operation, the inner support 20 is pulled out of the outer support 12 as desired before the pin 24 is inserted into the slots 16 of the adjusting seat 14 and the pin holes 22 of the inner support 20. The nut 18 is rotated by the handle 19 to locate the pin 24.

Such a prior art steel post 10 as described above has drawbacks, which are described explicitly hereinafter.

The adjustment of the length of the post 10 can not be done quickly in view of the fact the pin 24 is used to locate the inner support 20, and that the slots 16 of the adjusting seat 14 must be aligned with the pin holes 22 of the inner support 20, and further that the process of rotating the nut 18 to urge the pin 24 is time consuming, as illustrated in FIG. 2. In addition, the pin holes 22 can undermine the structural strength of the inner support 20. The inner support 20 is located by the pin 24, which is insufficient to cope with the shearing stress. Moreover, the nut 18 must be rotated to allow the inner support 20 to move lower so as to enable the operator to pull the pin 24 out. The inner support 20 can not be drawn into the outer support 12 completely to shorten the overall length of the post 10, as illustrated in FIG. 3.

SUMMARY OF THE INVENTION

The primary objective of the present invention is to provide an improved steel post which is free from the drawbacks of the prior art steel post described above.

In keeping with the principle of the present invention, the foregoing objective of the present invention is attained by a steel post, which is composed of an outer tube, an inner tube, two retaining members, a handle, a position confining member, and a fastening element. The retaining members are mounted on the top of the outer tube such that the threads of the retaining members are engageable with the threads of the inner tube which is received in the outer tube. The position confining member is located between the two retaining members for confining the upward displacement of the retaining members. The fastening element is used to facilitate the fastening and the unfastening of the retaining members.

The foregoing objective, features, functions, and advantages of the present invention will be more readily understood upon a thoughtful deliberation of the following detailed description of the embodiments of the present invention with reference to the accompanying drawings.

BRIEF DESCRIPTION OF THE DRAWINGS

FIG. 1 shows a perspective view of a steel post of the prior art.

FIGS. 2 and 3 show the unfolded and folded states of the prior art steel post.

DETAILED DESCRIPTION OF THE INVENTION

Figure 4:
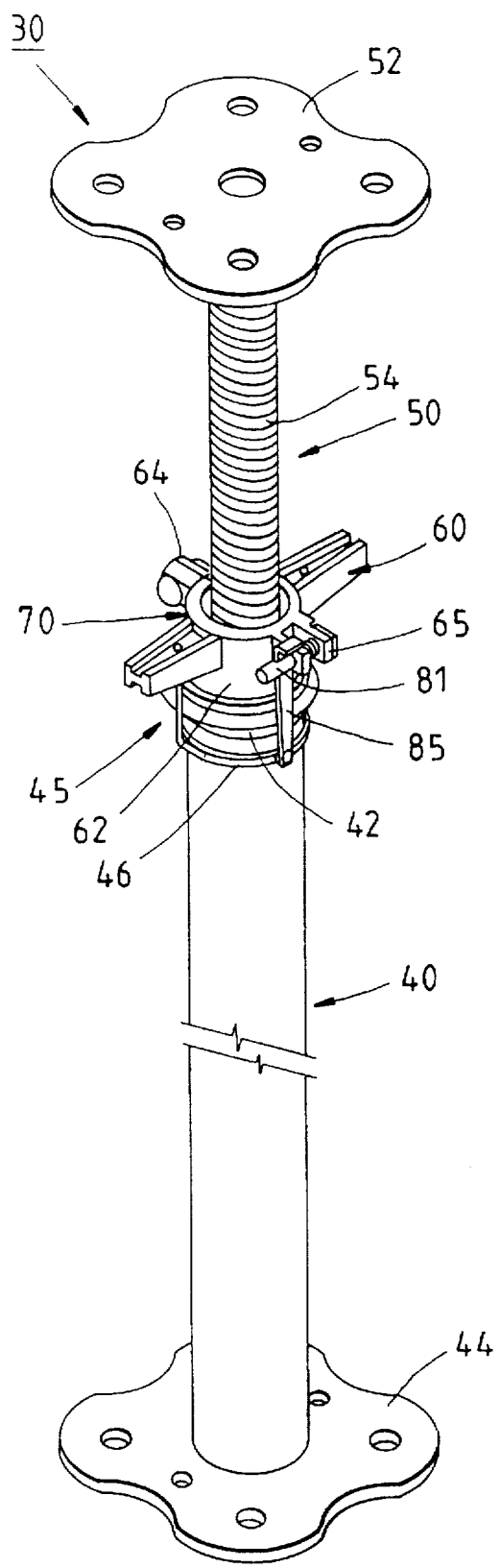
FIG. 4 shows a perspective view of a steel post of the present invention.
Figure 5:
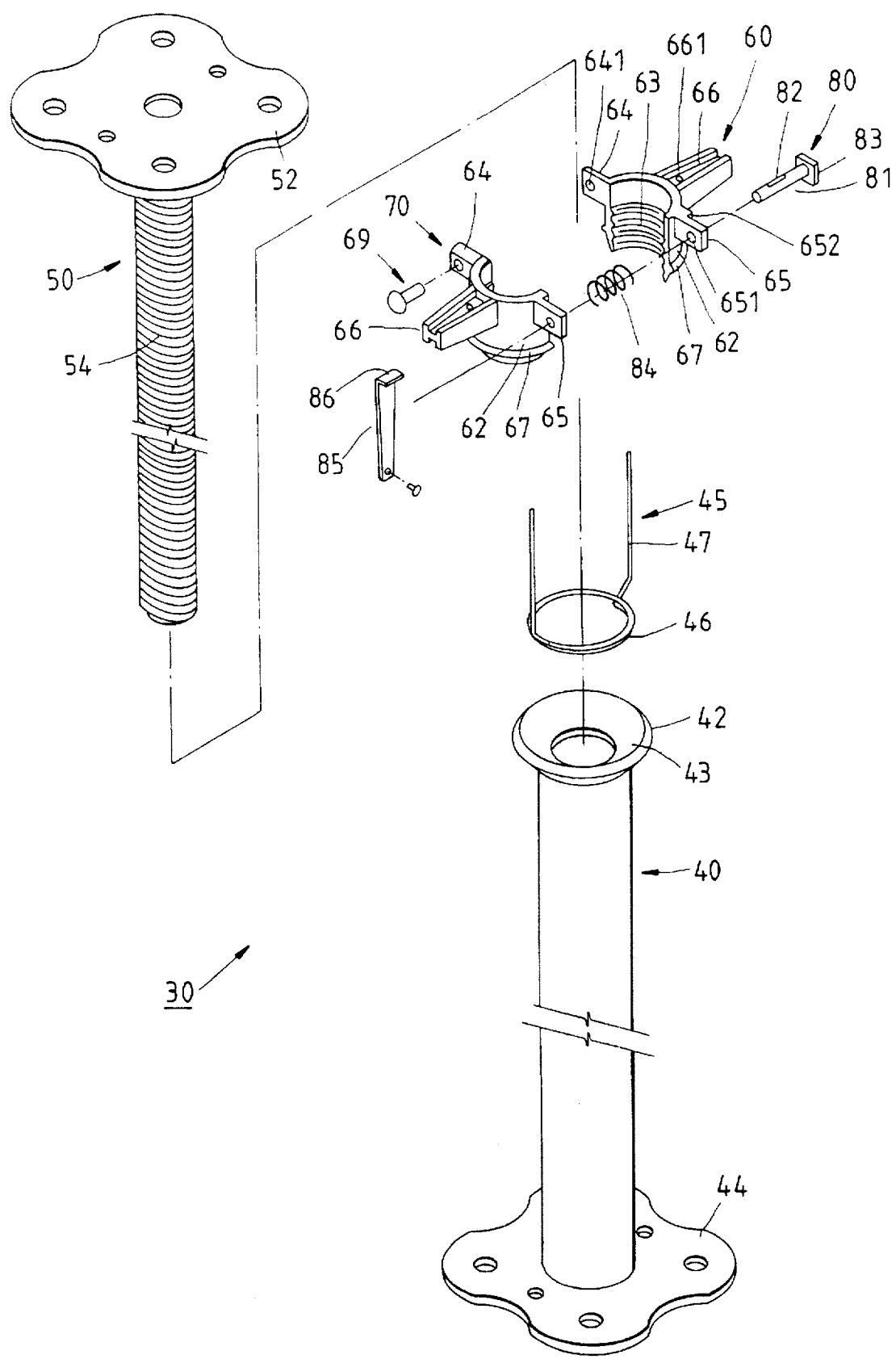
FIG. 5 shows an exploded view of the steel post of the present invention.

As shown in FIGS. 4 and 5, a steel post 30 embodied in the present invention is composed of the component parts, which are described explicitly hereinafter.

An outer tube 40 is provided at the top end thereof with an elarged flat portion 42 having a tapered portion 43.

A position confining member 45 has a ring-shaped body 46, and two connection ends 47 extending from the body 46. The confining member 45 is joined with the outer tube 40 such that the body 46 is fastened with the outer tube 40 and that the body 46 is stopped by the flat portion 42 of the outer tube 40.

An inner tube 50 is provided with trapezoidal threads 54 and is received in the outer tube 40.

Figure 7:
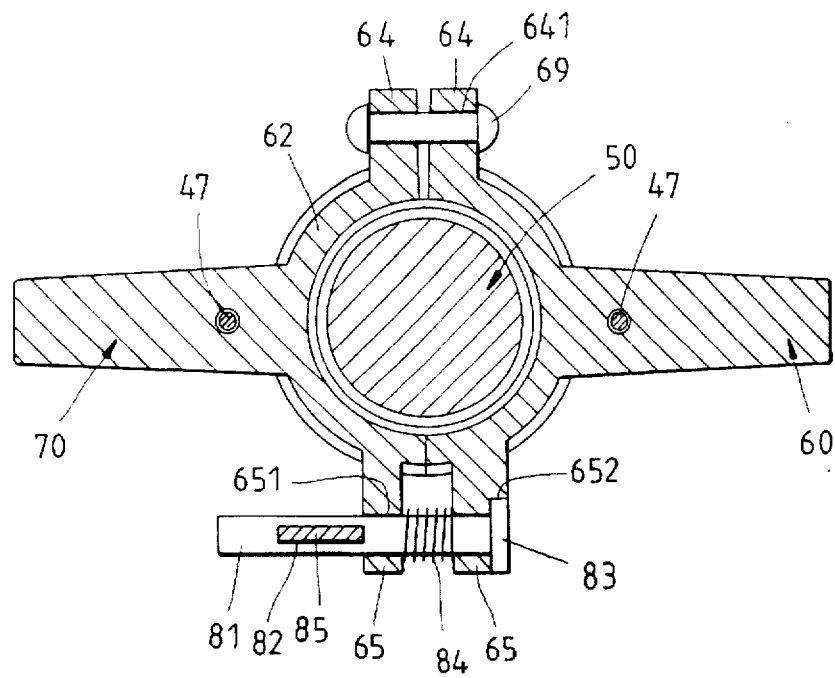
FIG. 7 shows a sectional view of a portion taken along the direction indicated by a line 7-7 as shown in FIG. 4.

Two retaining members 60 and 70 are constructed symmetrically. As a result, only the retaining member 60 will be described. The retaining member 60 has a body 62 which is semicircular in its cross section and is provided in the inner circumferential surface thereof with a plurality of semi-threaded portions 63. The body 62 is further provided in the outer circumferential surface thereof with a connection portion 64, a lug 65, and a handle 66 located between the connection portion 64 and the lug 65. The body 62 is still further provided in the periphery thereof with a projection 67 and a tapered end. A pivoting member 69 is received in the through holes 641 of the connection portions 64 of the retaining members 60 and 70, as shown in FIG. 7. The lugs 65 of the retaining members 60 and 70 can be opened and closed.

A fastening member 80 comprises a rod member 81 and a retaining rod 85. The rod member 81 is provided with a slot 82 and is fastened pivotally with the lugs 65 such that the head 83 is engaged with a retaining portion 652 of the lug 65. The rod member 81 is fitted into an elastic element 84 which has two ends urging the two lugs 65 to enable the opening and closing side of the retaining members to expand at such time when the retaining members are not exerted on by an external force. The retaining rod 85 is provided at one end thereof with a press portion 86 and is received in the slot 82 of the rod member 81 such that the retaining rod 85 is located between the rod member 81 and the lug 65.

Two retaining members 60 and 70 are mounted on the tapered portion 43 of the flat portion 42 of the outer tube 40 such that the two retaining members 60 and 70 form a threaded axial hole. The alignment of the semi-threaded portions 63 to form the threaded axial hole can be checked by the two projections 67. The connection ends 47 of the position confining member 45 are received in the through holes 661 of the handles 66 of the retaining members 60 and 70, as shown in FIG. 6.

Figure 6:
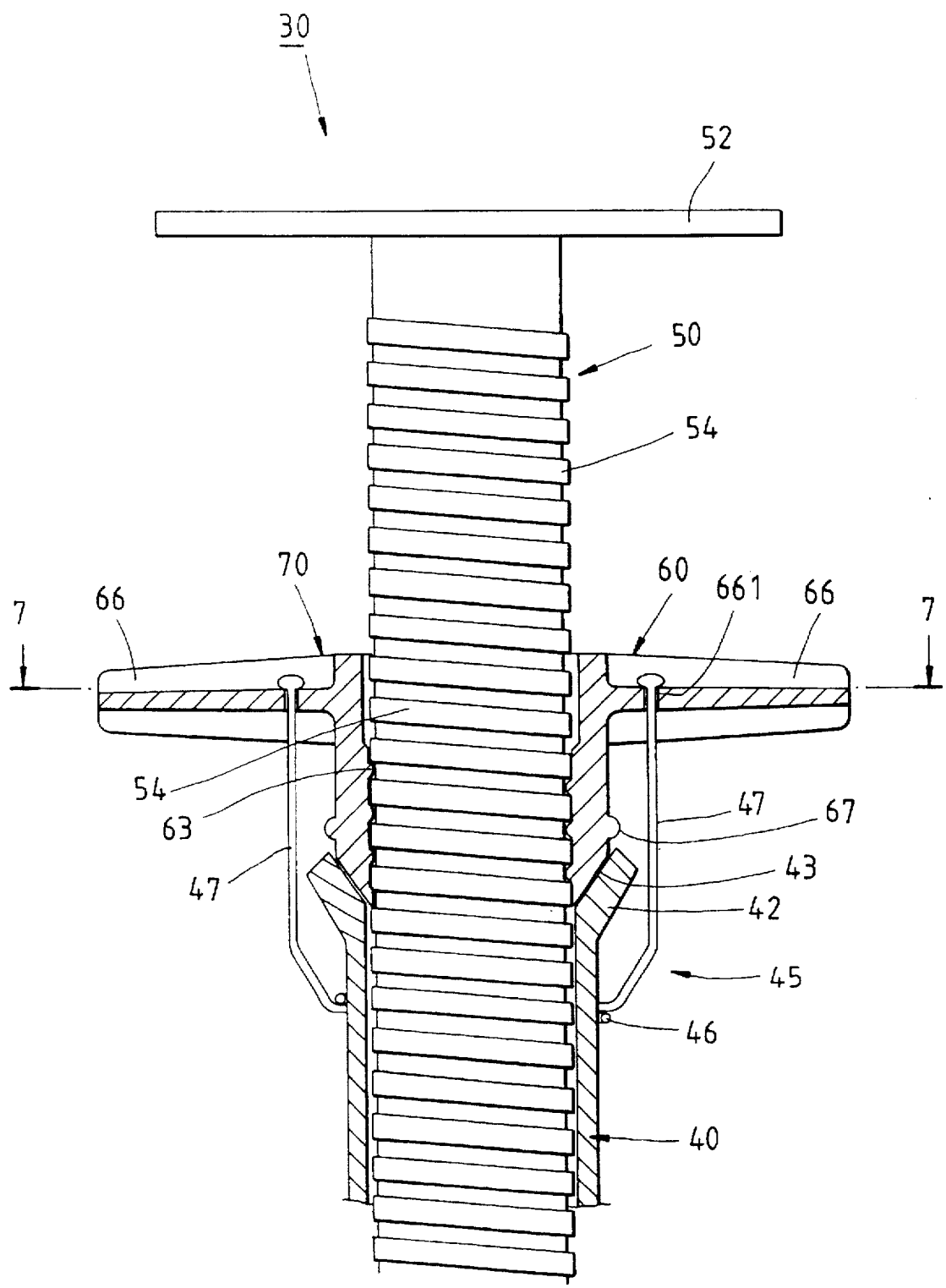
FIG. 6 shows a longitudinal sectional view of the steel post of the present invention.
Figure 8:
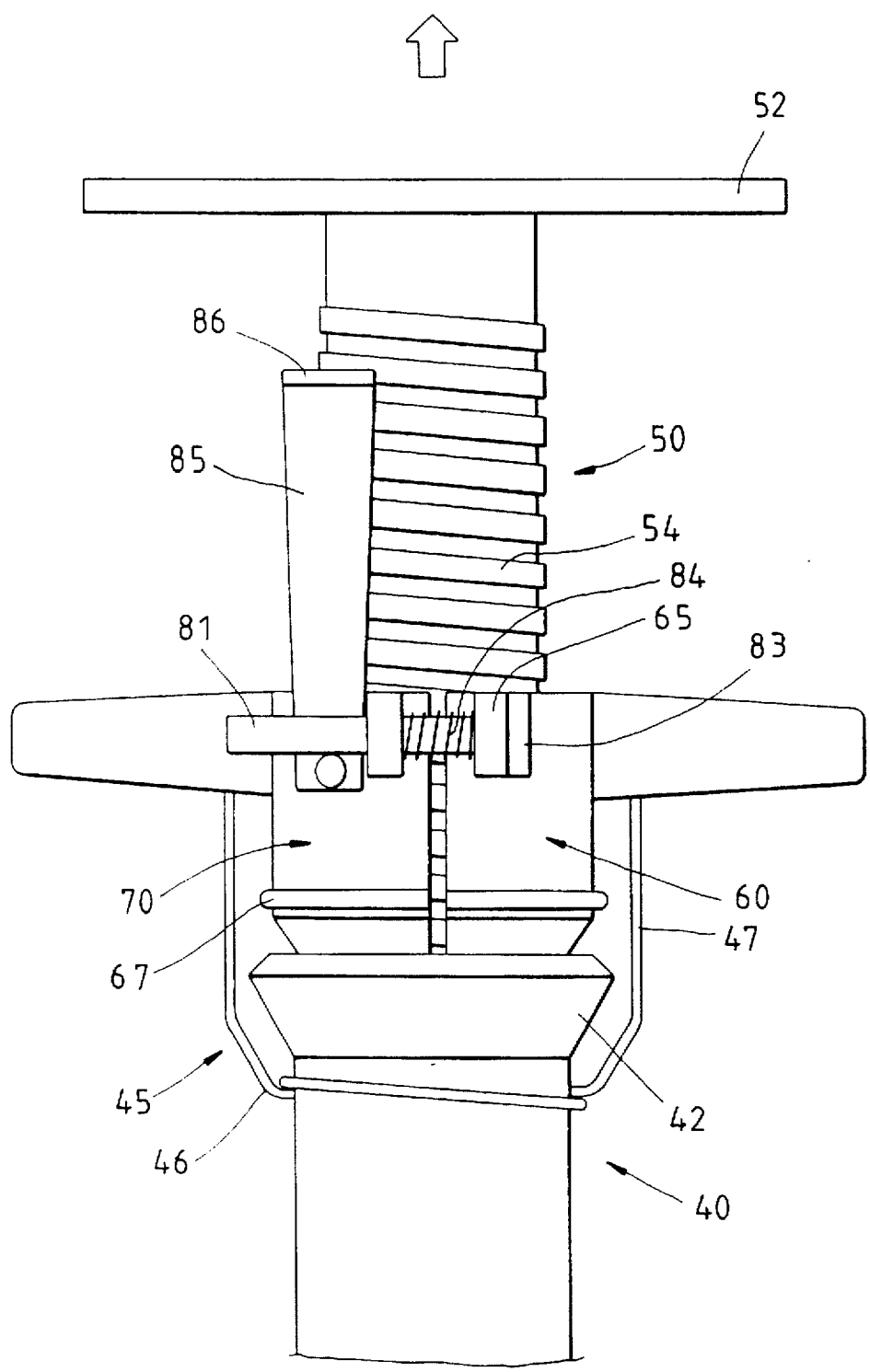
FIG. 8 shows a front view of the present invention as shown in FIG. 6.
Figure 9:
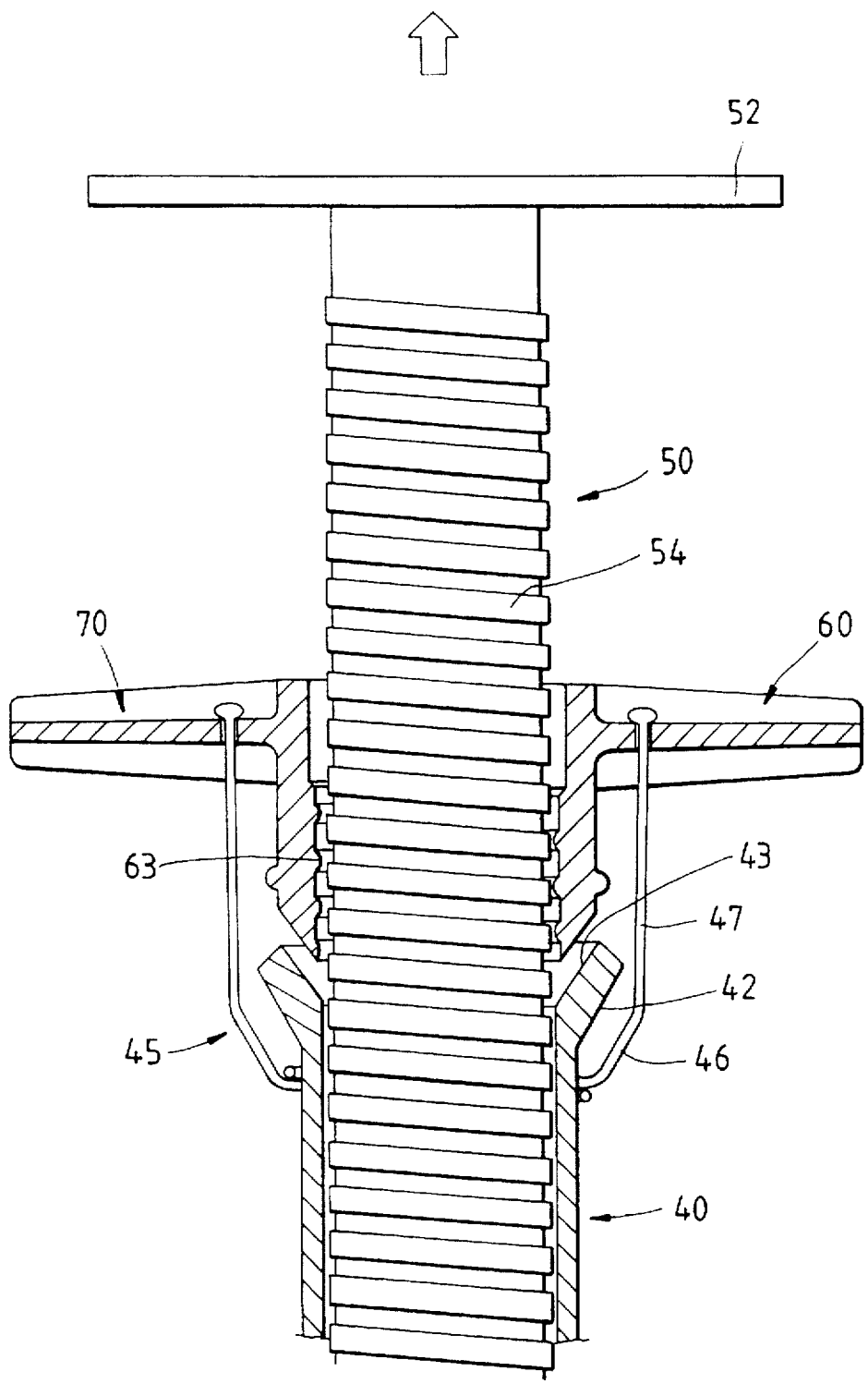
FIG. 9 shows a longitudinal sectional view of the present invention as shown in FIG. 8.

The threads of the inner tube 50 are engageable with the threads 63 of the retaining members 60 and 70, as shown in FIG. 6. In operation, the retaining rod 85 is lifted, as shown in FIG. 8, such that the bottom end the retaining rod 85 is located in the slot 82 of the rod member 81. The inner tube 50 can be telescopically extended by pressing the bottom plate 44 of the outer tube 40 until such time when the top plate 52 of the inner tube 50 has reached a desired position to support the molding board. In the process of extending the inner tube 50, the retaining members 60 and 70 move upwards along with the inner tube 50, as shown in FIG. 8, such that the bottoms of the retaining members 60 and 70 are no longer confined by the tapered portion 43 of the outer tube 40, and that the opening and closing sides of the retaining members 60 and 70 are forced by the elastic element 84 to open up to become disengaged with the inner tube 50. As soon as the extended inner tube 50 is released, the threads 54 of the inner tube 50 become engaged with the threads 63 of the retaining members 60 and 70 so as to locate securely the outer tube 50. The outer tube 50 can be extracted. However, the outer tube 50 can not be retracted in view of the one-way ratcheting effect of the retaining members 60 and 70 in conjunction with the tapered portion 43.

Figure 10:
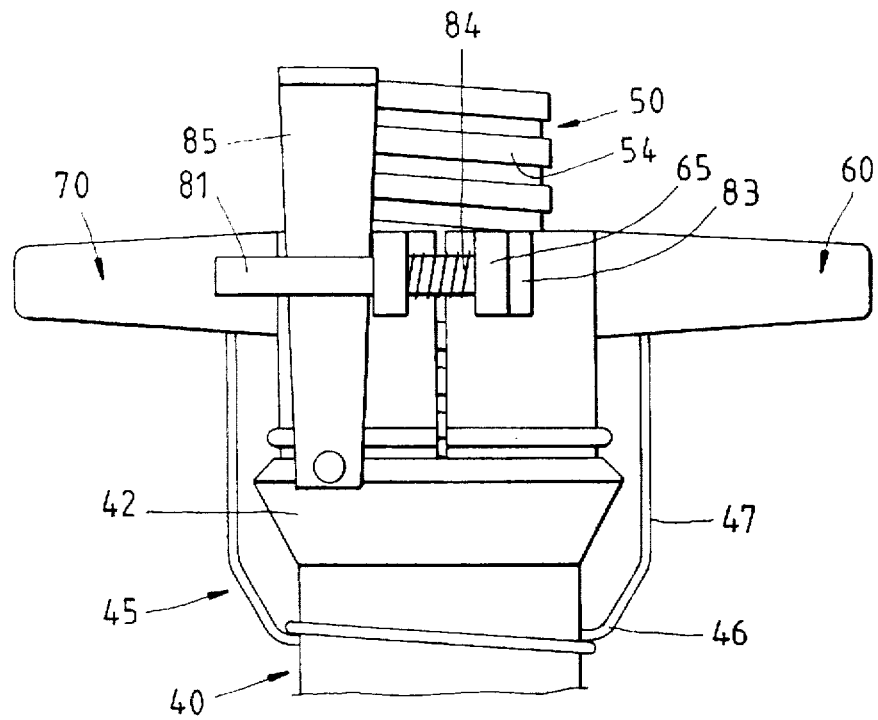
FIG. 10 is a schematic view showing that the retaining members of the present invention are pressed against by the retaining rod.

In order to enable the top plate 52 to make contact with the molding board in the event that the top plate 52 remains a short distance apart from the molding board, the retaining rod 85 is pressed with finger, as shown in FIG. 10, so as to allow the midsection of the retaining rod 85 to be located in the slot 82. The handles 66 are then turned counterclockwise to actuate the threads 63 o move the inner tube 50 upwards until the top plate 52 makes contact with the molding board.

Figure 11:
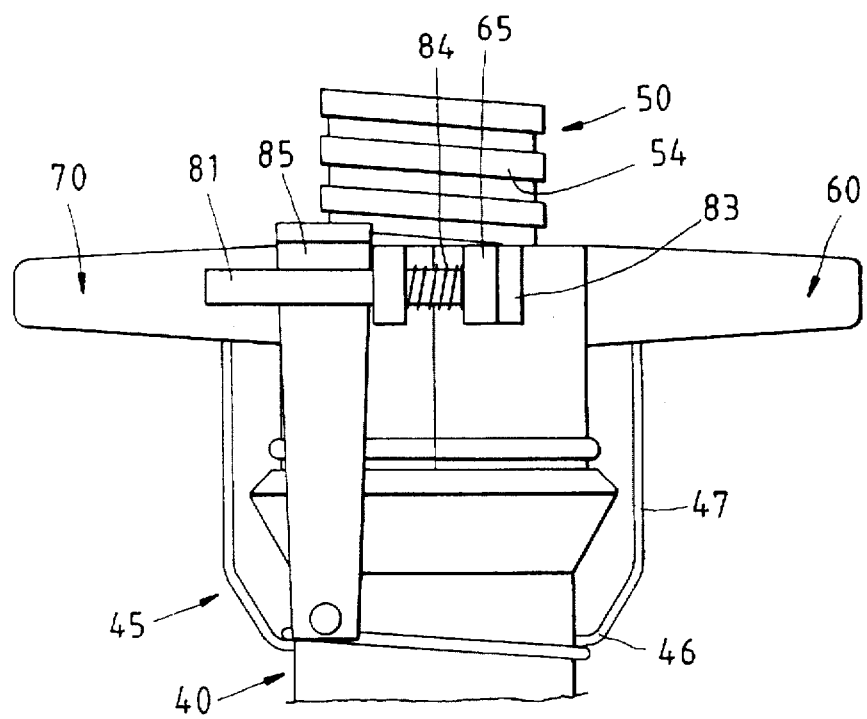
FIG. 11 is another schematic view showing that the retaining members of the present invention are pressed against by the retaining rod.

In order to make sure that the extracted inner tube 40 is securely engaged with the retaining members 60 and 70, the retaining rod 85 is forced to move downwards in the slot 82 by a hammer, as shown in FIG. 11. As a result, the retaining members 60 and 70 are so securely engaged with the inner tube 40 that the retaining members 60 and 70 can not be accidentally rotated.

Figure 12:
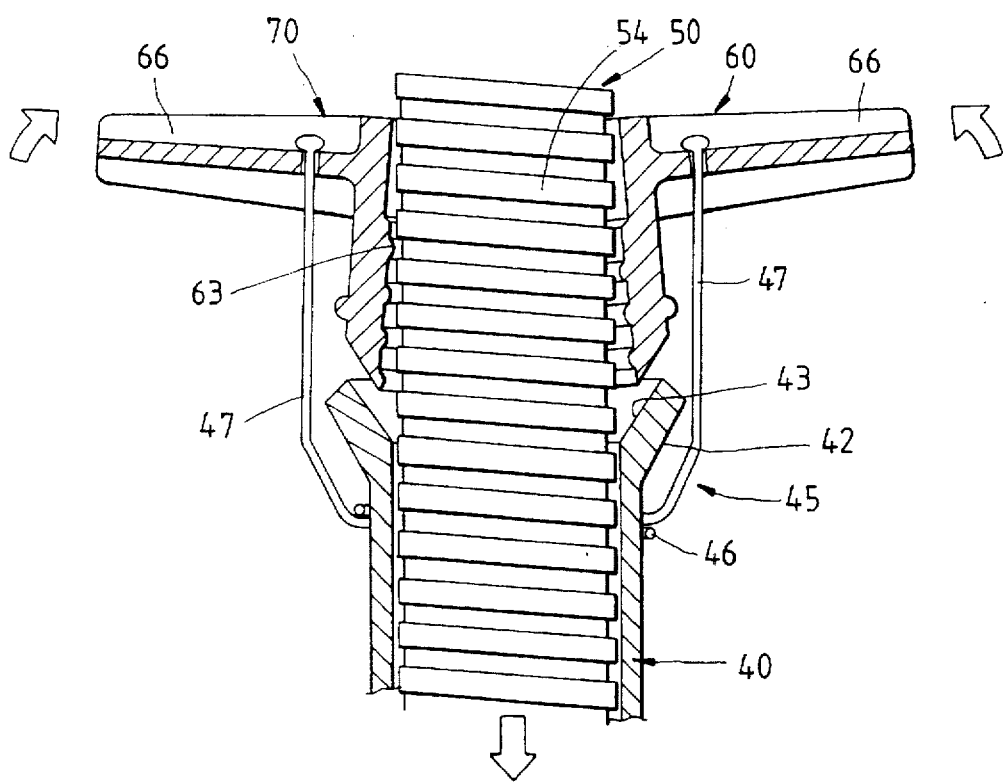
FIG. 12 is a schematic view showing that the inner tube of the present invention is relieved of the holding by the retaining members.

The extracted inner tube 50 can be retracted back into the outer tube 40 by causing the retaining rod 85 to move upwards to enable the retaining members 60 and 70 to be rotated clockwise by the handles 66, thereby causing the inner tube 50 to move downwards away from the molding board. As the handles 66 are lifted with both hands, the retaining members 60 and 70 are no longer confined by the tapered portion 43 and are therefore able to spread out, as shown in FIG. 12. The threads 63 of the retaining members are disengaged with the threads 54 of the inner tube 50. The inner tube 50 is then caused by its own weight to retract back into the outer tube 40. As the handles 66 are let go, the retaining members 60 and 70 are released to fall back on the tapered portion 43 to remain in the state as shown in FIG. 6.

Figure 13:
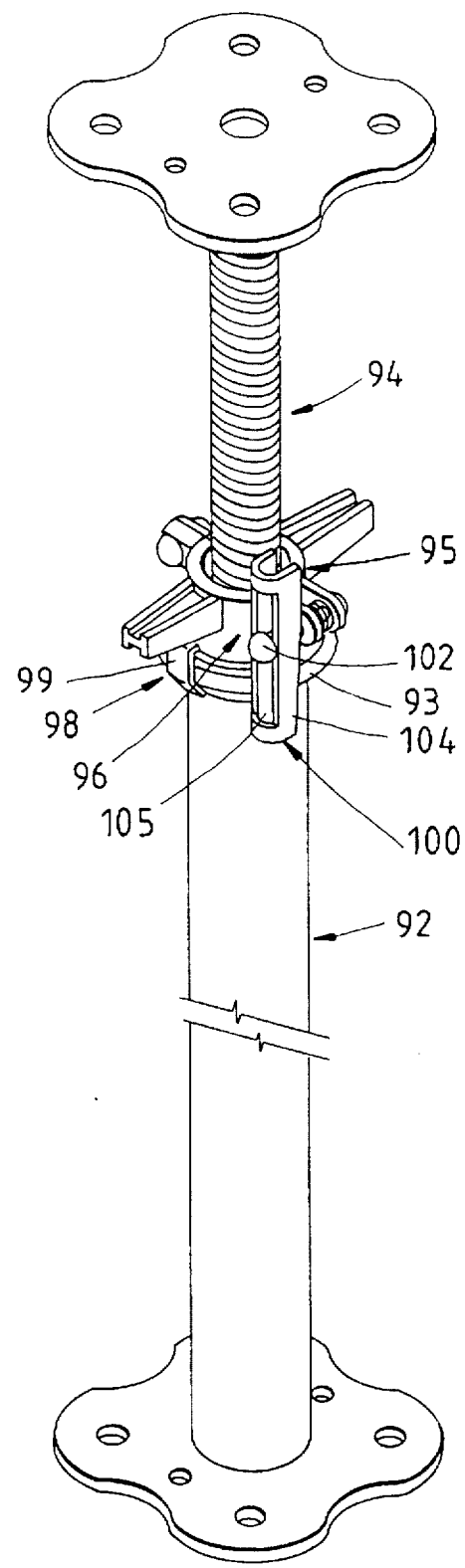
FIG. 13 shows a perspective view of another embodiment of the present invention.
Figure 14:
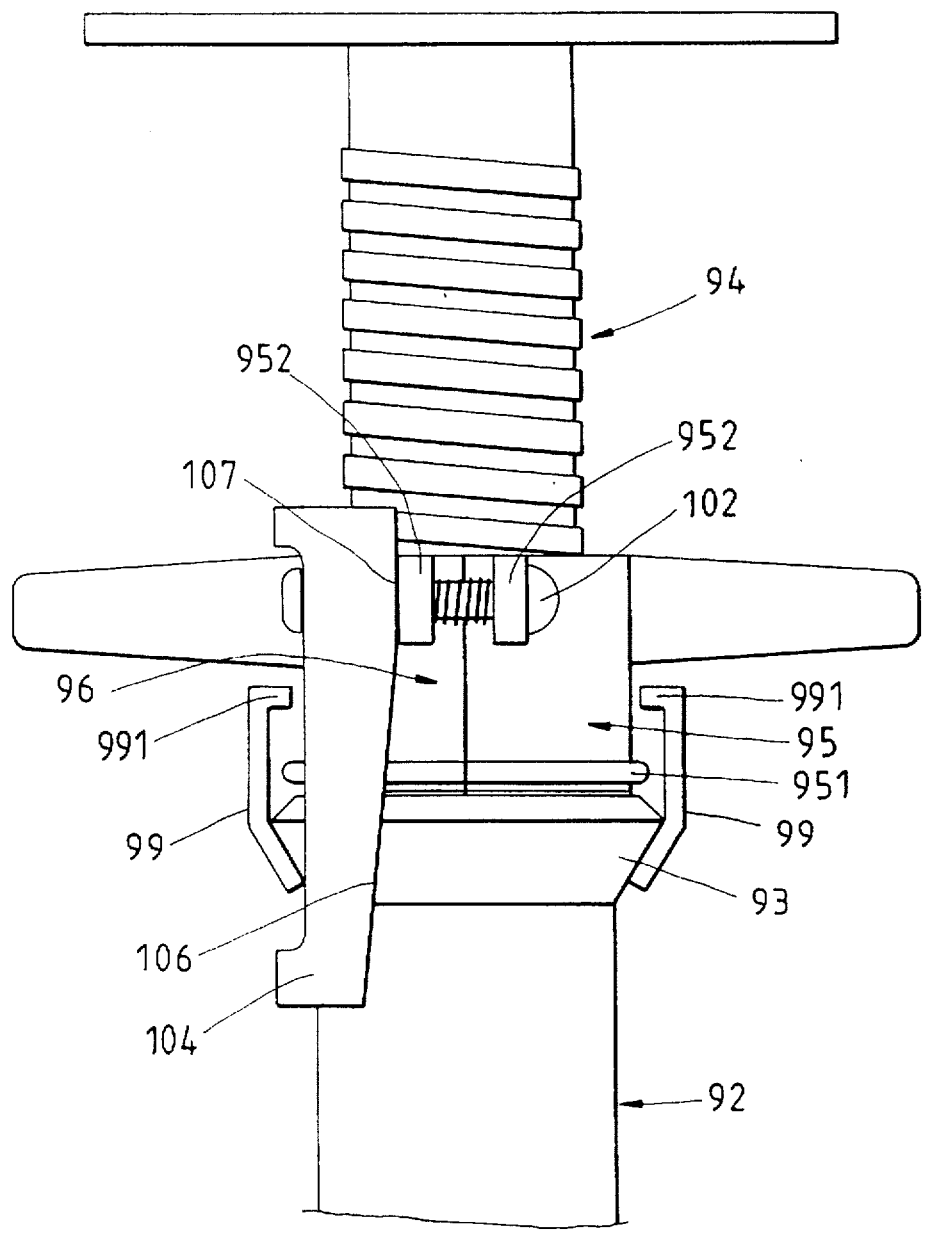
FIG. 14 shows a front view of the present invention as shown in FIG. 13.

As shown in FIGS. 13 and 14, a second embodiment of the present invention consists of an outer tube 92, an inner tube 94, two retaining members 95 and 96, a position confining member 98, and a fastening member 100. The second embodiment is different from the first embodiment in that the position confining member 98 is composed of two hooked pieces 99, which are fastened with the flat portion 93 of the outer tube 92 such that the hooked portions 991 of the hooked pieces 99 are engaged with the projections 951 of the retaining members 95 and 96.

The fastening member 100 consists of a rod member 102 located between the lugs 952 of the retaining members 95 and 96, a retaining rod 104 having a slot 105 and a tapered portion 106 provided with a straight surface 107. The retaining rod 104 is movably engaged with the rod member 102 such that the retaining rod 104 is stopped by the lug 952 of the retaining member and the head of the rod member 102.

What is claimed is:

1. A steel post comprising:
    an outer tube provided at one end thereof with a tapered portion;
    an inner tube provided on outer wall thereof with threads and received slidably in said outer tube such that said inner tube can be extracted and retracted;
    two retaining members provided respectively in inner circumferential surface thereof with a semi-threaded portion, and in outer circumferential surface thereof with a handle, said two retaining members being arranged such that they are opposite to each other and that they can be moved in opposite and corresponding directions, said two retaining members being mounted on said tapered portion of said outer tube such that said retaining members embrace said inner tube, and that threads of said semi-threaded portions of said retaining members are engageable with said threads of said inner tube;
    a position confining member mounted on said one end of said outer tube such that said position confining member is located between said two retaining members for confining the displacements of said two retaining members; and
    at least one fastening member for fastening said two retaining members so as to locate said inner tube and for unfastening said two retaining members so as to let go said inner tube.

2. The steel post as defined in claim 1, wherein said position confining member has a ring body slidably engaged with said outer tube, said position confining member further having two connection ends extending from said ring body to engage said two retaining members.

3. The steel post as defined in claim 2, wherein said two connection ends are fastened with said handles.

4. The steel post as defined in claim 2, wherein said one end of said outer tube is provided with an enlarged flat portion engageable with said ring body of said position confining member.

5. The steel post as defined in claim 1, wherein said one end of said outer tube is provided with an enlarged flat portion on which said tapered portion is located.

6. The steel post as defined in claim 1, wherein said position confining member consists of two hooked pieces fastened with said one end of said outer tube such that said two hooked pieces are capable of stopping said retaining members.

7. The steel post as defined in claim 6, wherein said retaining members are provided respectively with a projection engageable with one of said two hooked pieces.

8. The steel post as defined in claim 1, wherein said retaining members are provided respectively and correspondingly with a projection.

9. The steel post as defined in claim 1, wherein said retaining members are provided respectively and correspondingly with a lug; wherein said fastening member is provided with a connection member engaging said lugs of said retaining members; and further comprising a retaining rod movably located between said connection member and said lugs to press against said retaining members.

10. The steel post as defined in claim 9, wherein said connection member is provided with a slot; and wherein said retaining members are received in said slot such that said retaining members are in contact with said lugs.

11. The steel post as defined in claim 9, wherein connection member has one end passing the vicinity of one of said lugs; wherein said connection member is provided with a slot; and wherein said retaining rod is in contact with one of said lugs via said slot.

12. The steel post as defined in claim 9, wherein one of said lugs is provided with a stopping portion; and wherein said connection member has a head and a body, with said body being located between said lugs such that said head is stopped by said stopping portion.

13. The steel post as defined in claim 9, wherein said retaining rod is provided with a slot; wherein said connection member is received in said slot; and wherein said retaining rod is in contact with one of said lugs.

14. The steel post as defined in claim 13, wherein said retaining rod is provided with a straight surface and a tapered surface.

15. The steel post as defined in claim 1, wherein said retaining members form a movable side and a connection side engaging a pivoting member.

* * * * *